US011282136B2

(12) United States Patent
Restorff et al.

(10) Patent No.: US 11,282,136 B2
(45) Date of Patent: Mar. 22, 2022

(54) AI SYSTEM FOR PROCESSING HISTORICAL DATA TO IDENTIFY AND RECONFIGURE PRESCHEDULED, SUBOPTIMAL EVENTS

(71) Applicant: Bank of America Corporation, Charlotte, NC (US)

(72) Inventors: Christopher Keith Restorff, Carrollton, TX (US); Caitlin Rose Chrisman, Mountain View, CA (US); Shalini Johar, San Jose, CA (US); Murlidhar Reddy Gummakonda, Flower Mound, TX (US); Ashley Lauren Rozek, Charlotte, NC (US); Gregory Hugh Gunn, Charlotte, NC (US); Kevin Cole, Charlotte, NC (US); Pamela Fong, San Francisco, CA (US); Diane S. Cannato, Palm City, FL (US); Prashanth Vallabhaneni, Chadds Ford, PA (US)

(73) Assignee: Bank of America Corporation, Charlotte, NC (US)

( * ) Notice: Subject to any disclaimer, the term of this patent is extended or adjusted under 35 U.S.C. 154(b) by 115 days.

(21) Appl. No.: 16/928,359

(22) Filed: Jul. 14, 2020

(65) Prior Publication Data
US 2022/0020083 A1    Jan. 20, 2022

(51) Int. Cl.
*G06Q 40/02* (2012.01)
*G06N 5/04* (2006.01)
*H04L 67/55* (2022.01)
*G06N 20/00* (2019.01)

(52) U.S. Cl.
CPC ............... *G06Q 40/02* (2013.01); *G06N 5/04* (2013.01); *G06N 20/00* (2019.01); *H04L 67/26* (2013.01)

(58) Field of Classification Search
CPC .......... G06Q 40/02; G06N 20/00; G06N 5/04; H04L 29/08
See application file for complete search history.

(56) References Cited

U.S. PATENT DOCUMENTS

2015/0350144 A1* 12/2015 Zeng ....................... H04L 51/22
                                                                     709/206
2019/0019213 A1*  1/2019 Silberman .......... G06Q 30/0243

\* cited by examiner

*Primary Examiner* — Scott S Trotter
(74) *Attorney, Agent, or Firm* — Weiss & Arons LLP

(57) ABSTRACT

An entity may generate generic notifications for transmittal to a plurality of customers. One of the notifications may not be properly customized for a customer to whom the notification is scheduled for deployment. A system is provided that generates and refines generic notifications using artificial intelligence ("AI"). The system may include an application server running an AI engine for periodically monitoring, at a given point in time, historical customer data relating to less than a predetermined number of customers to ensure reduced, relative to a predetermined baseline, processing usage. The AI engine may determine, during the monitoring, that notifications transmitted by the platform to one of the customers have failed to elicit a positive response from the customer. The determination may prompt the AI engine to put the generic notification on hold for the customer and to perform additional steps to alter the generic notification to a targeted notification.

20 Claims, 4 Drawing Sheets

AI SYSTEM FOR PROCESSING HISTORICAL DATA TO IDENTIFY AND RECONFIGURE PRESCHEDULED, SUBOPTIMAL EVENTS

FIELD OF TECHNOLOGY

Aspects of the disclosure relate to using artificial intelligence ("AI") to identify suboptimal events and take remedial action.

BACKGROUND

Organizations may generate a generic notification for transmission to a large number of its customers. Sometimes, the customers to whom the notification is scheduled for deployment may be customers who meet one or more pre-stored characteristics. Generation of such notifications is a simple method for reaching out to the organization's customer base.

Due to the large-scale nature of such actions, however, the notification may be a sub-optimal method of reaching out to at least some of the customers. This may be as a result of having recently 'over-touched' a customer, a customer's life event, a unique method by which the customer prefers receiving notifications, or any other customer-specific fact pattern.

To generate targeted, customized notifications for a large volume of customers is a technically challenging and burdensome process that requires a large amount of processing power and a lengthy turn-around time. However, targeted customer notifications are ideal for increasing customer satisfaction and augmenting the probability of a customer reviewing and responding to the notification.

It would be desirable, therefore, to provide a system that supports the generation of large-scale generic notifications while, at the same time, running a background AI system for reviewing and, in some instances, tailoring at least some of the generic notifications to meet individual customer needs. This synthesis of generic and customized notifications would enable an organization to benefit from large-scale notification methods while running background processes that provide more optimized targeting methods without requiring burdensome processing overhead. Therefore, it is desirable to provide apparatus and methods for an AI SYSTEM FOR PROCESSING HISTORICAL DATA TO IDENTIFY AND RECONFIGURE PRE SCHEDULED, SUBOPTIMAL EVENTS.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
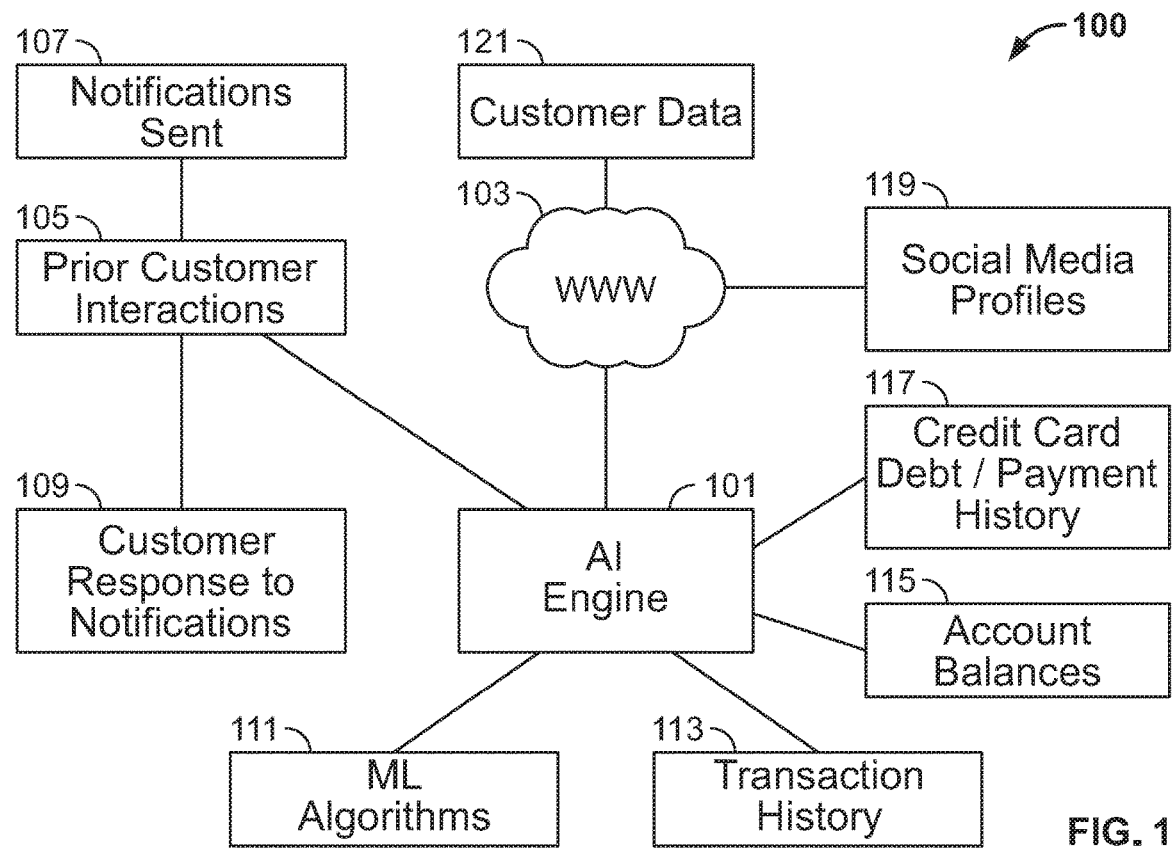
FIG. 1 shows illustrative system architecture in accordance with principles of the disclosure.

Systems and methods are provided for leveraging artificial intelligence to monitor and review generic notifications generated by a platform. The generic notifications may be generated by the platform for a customer. The generic notifications may be generated for a plurality of customers. The plurality of customers may include the customer.

For the purposes of the application, a 'generic notification' may be a notification prepared for transmission to a plurality of customers where one or more characteristics of the notification are 'generic'—i.e. the same—for each of the plurality of customers without taking into account individual customer needs. For example, the generic notification may be transmitted to the plurality of customers at the same time of day, using the same method of transmission (e.g. e-mail, application notification, etc.), including at least portions of the same text, etc.

The generic notification may include elements that are keyed to a recipient's personal information. The recipient may be the customer. The recipient may one of the plurality of customers. For example, the generic notification may include a recipient's credit card balance, remaining months to pay off the balance using minimum payments, a link to the recipient's bank account for offering the option of paying off some or all of the balance, or any other elements keyed to the recipient's personal information.

The systems and methods may include a method for leveraging an AI engine to intercept and refine a generic notification generated by the platform. The generic notification may be generated for transmission to a plurality of customers. The plurality of customers may include the customer. The AI engine may leverage machine learning and historical behavioral trends.

The methods may include using the platform to schedule the generic notification for deployment to the plurality of customers. The generic notification may be scheduled for deployment to each of the plurality of customers at a first time of day and in a first method of presentation. Exemplary methods of presentation include a text message, an email, a display on a homepage of a device, a post on a social media page, a notification on a smart device, and any other suitable electronic method of presentation.

The generic notification may include first information. The first information may include data relating to a savings opportunity. The first information may include a functionality linked to an account of a recipient of the notification to pay off outstanding debt.

The first information may include any suitable information for transmitting to a customer. Exemplary first information may include a display of a credit card debt monthly payment amount and a savings amount, a display of a total debt amount associated with the customer, purchasing opportunities, loan offers, upgrades, bonus packages, and/or any other suitable promotional or educational information.

In some embodiments, each of the plurality of customers may be determined by the platform to have an account that satisfies one or more predetermined conditions.

The methods may include the platform determining that an account of the customer satisfies the one or more predetermined conditions. In some embodiments, the platform may make this determination by accessing the customer's stored financial history and determining the customer owns a credit card with a credit card debt amount above a threshold value and that a time frame remaining for the customer to pay off the credit card debt amount is greater than a predetermined time frame. The credit card debt amount may be a user's most recent credit card statement balance. The one or more predetermined conditions may be any other suitable conditions, such as a minimum account balance, a minimum or maximum number of accounts, whether or not a customer already has purchased/owns a certain service or account, or any other suitable condition.

Additional predetermined conditions may include whether or not the customer has a current account balance that is sufficient to pay off the credit card debt amount and how recently the platform has generated a notification to the customer.

The accessing and determining may be performed for the plurality of customers. The plurality of customers may be identified by the platform by analyzing customer data from a larger group of customers to identify the plurality of customers, each of the plurality of customers satisfying the one or more predetermined conditions.

The platform may select the first time of day, the first method of presentation and/or the first information without evaluating data specific to the customer. In some embodiments, the first time of day may be, for each of the customer's included in the plurality of customers, aligned with a billing cycle of each of the customers.

The methods may include periodically monitoring, using the AI engine, historical data stored by the platform and associated with the customer. The historical data may have been generated within a predetermined time window. The historical data may include notifications transmitted by the platform to the customer. The notifications reviewed by the AI engine during the monitoring may be a subset of notifications stored by the platform and associated with the customer.

In some embodiments, the AI engine may periodically monitor randomly-selected historical customer data stored by the platform. The randomly-selected historical data may be generated within a predetermined time window and include notifications transmitted by the platform to the customer. A size of the randomly-selected historical customer may be less than a predetermined threshold value. This may ensure that the AI engine's monitoring is below a threshold processing level.

The historical data, which in some embodiments may be randomly-selected historical data, may include a predetermined number of interactions between the platform and the customer. In the event that the customer's historical data does not include the predetermined number of interactions between the platform and the customer during the time window, the AI engine may truncate the monitoring of the customer's historical data. The customer may be a first customer. When the first customer's historical data does not include the predetermined number of interactions, the AI engine may then proceed to monitor a second customer's historical data.

The AI engine may concurrently monitor data relating to one, two, three, four, or more customers included in the plurality of customers as described herein. As the AI engine completes the monitoring (and, in some embodiments, the prompting and generating of the targeted notification) for a monitored customer, the AI engine may start to monitor customer data of another customer. This way, the AI engine may continually perform monitoring of a predetermined number of customers included in the plurality of customers as described above in connection with the customer. When all the customers have been monitored, the AI engine may start again with the first group of customers.

The methods may include determining, using the AI engine, during the monitoring and prior to the transmission of the generic notification to the customer, that the notifications monitored by the AI engine failed to elicit a positive response from the customer. The determination may prompt the AI engine to access and review a larger amount of customer data than was accessed during the monitoring.

The positive customer response may include one or more of a customer selection of a link displayed in a notification, a customer selection of a slidable icon in a notification, an input of data into the notification, a scrolling up or down of a display included in the notification, or any other suitable customer response that indicates that the customer responded in a positive way to the notification. The positive customer response may not include a selection, by the customer, to minimize, or close, the notification.

The AI engine, when prompted, may instruct the platform to put the scheduled deployment of the generic notification to the customer on hold. The putting of the notification on hold may suspend the deployment of the generic notification to the customer.

The AI engine, when prompted, may tag notifications stored in the database that elicited a positive customer response and filter the tagged notifications by a time of day, a method of presentation, and a topic.

In some embodiments, the AI engine may generate a predictive recommendation for a tickler for presenting to the customer. The predictive recommendation may be generated based on the tagging and the filtering. For example, for the notifications that received positive customer responses, the notifications may be filtered by a time of day that the notification was transmitted. The time of day that occurs the most in the notifications (or, if there are multiple times of day, a time of day that reflects an average of two, three, four, or more times of day that are the most similar) may then be identified as an optimized time. The notifications that received the positive customer responses may then be filtered by a method of presentation. The method of presentation represented the most may then be identified as an optimized method of presentation. The notifications that received the positive customer responses may then be filtered based on topic, such as banking, mortgages, credit cards, etc., and the topic represented the most may then be identified as an optimized topic.

The predictive recommendation may include the optimized time of day, the optimized method of presentation, and the optimized topic for including in the tickler. The optimized method of presentation may be one of the methods of presentation described above.

In some embodiments, the AI engine may instruct the platform to transmit the tickler to the customer. The platform may transmit the tickler to the customer and the AI engine may evaluate the customer's response to the tickler. The AI engine may determine that a positive customer response is received in response to the tickler.

The methods may include determining, using the AI engine, that a positive customer response is not received in response to the tickler. When a positive customer response is not received in response to the tickler, the methods may include recursively improving the decisioning of the AI engine by retrieving, by the AI engine, additional customer data, for feeding into the AI algorithms. The additional customer data may include publicly available customer data, historical customer transaction history, a customer account balance, and any other suitable data.

Recursively improving the decisioning of the AI engine by accessing the additional customer data may increase the frequency of how often the AI engine generates a tickler that results in a positive customer response. For example, the AI engine may determine that the customer is interested in a certain hobby or certain news topics by searching for publicly available customer data on the internet. In some embodiments, the AI engine may then prepare a new tickler to transmit to the customer, the new tickler including a photograph, blurb or short article relating to the customer's topic of interest. In some embodiments, the AI engine may then generate the targeted customer notification and include in the targeted notification the photograph, blurb or short article relating to the customer's topic of interest.

When the AI engine determines that a positive customer response is received in response to the tickler, the AI engine may then evaluate the generic notification to determine if it has characteristics conforming to the predictive recommendation.

In some embodiments, the AI engine may not generate a tickler. In some of these embodiments, the AI engine may generate a predictive recommendation for a targeted customer notification, the targeted customer notification including the optimized time of day, the optimized method of presentation, and the first information.

The methods may include the AI engine determining if the first time of day is the optimized time of day and if the first method of presentation is the optimized method of presentation. When the AI engine determines that the first time of day is the optimized time of day and the first method of presentation is the optimized method of presentation, the AI engine may instruct the platform to remove the hold on the generic notification and to schedule the generic notification for deployment to the customer.

When the AI engine determines that the first time of day is different from the optimized time of day, and/or that the first method of presentation is different from the optimized method of presentation, the AI engine may instruct the platform to overwrite the scheduled deployment of the generic notification to the customer with a scheduled deployment of the targeted customer notification to the customer. The targeted customer notification may be scheduled for deployment at the optimized time of day in the optimized method of presentation and including the first information.

Additionally, it follows that the periodic monitoring of the AI engine of the historical customer data enables the platform to integrate intermittent AI decisioning into customer interactions. Furthermore, the AI engine may be configured to monitor, at a given point in time, historical data associated with less than a predetermined number of customers to ensure reduced, relative to a predetermined baseline, processing usage. The baseline usage may be the processing usage that would be required to monitor customer data of all the plurality of customers as described herein prior to transmitting the generic notification.

Thus, the AI engine may refine characteristics of the generic notification, such as the time of day that the notification is transmitted and the method of presentation used to transmit the generic notification, to create a targeted customer notification that has a higher probability of being reviewed by the customer.

The methods may include the platform, prior to scheduling the generic notification for deployment to the customer, accessing the account of the customer and determining if the account has sufficient funds to pay off the outstanding debt. The methods may include the platform scheduling the generic notification for transmission to the customer if the account has the sufficient funds and deleting, or not scheduling, the generic notification if the account does not have the sufficient funds.

The first information may include a slidable icon positioned on a track. The slidable icon, when slid by the customer along the track, may modify the credit card debt monthly payment amount and the savings amount.

In some embodiments, sliding the slidable icon to the right, along the track, may decrease the credit card monthly payment amount and decreases the savings amount. Sliding the slidable icon to the left, along the track, may increase the credit card monthly payment amount and increase the savings amount.

In some embodiments, sliding the slidable icon to the left, along the track, may decrease the credit card monthly payment amount and decreases the savings amount. Sliding the slidable icon to the right, along the track, may increase the credit card monthly payment amount and increase the savings amount.

The platform may generate two or more generic notifications. The AI engine may perform the monitoring described herein for one or more customers in connection with each of the generic notifications. When a generic notification has been transmitted as scheduled, the AI engine may terminate the monitoring of the customers that were associated with the transmitted notification.

Using the disclosed apparatus, systems and methods, a platform may support transmission of large-scale notification transmission with light-weight, low processing AI system(s) running in the background to catch and refine individual instances where the large-scale notification transmission is suboptimal and possibly refine the notification as described herein.

In some embodiments, when a generic notification is scheduled for transmission to a plurality of customers, the AI engine may first rank the customers included in the plurality of customers and then monitor the plurality of customers based on the ranking. For example, the customers may be ranked based on how long they have been customers with an institution, how many accounts they have open with the institution, an account balance, previously-initiated interactions with the customer that had positive or negative results, or any other suitable data. Based on the ranking, the AI engine may then start with the highest or lowest ranking customers and monitor one or more customers at a time as described herein.

In some embodiments, the AI engine may monitor customers included in the plurality of customers as described above prior to transmission of the generic notification. The AI engine may determine that the generic notification is not properly configured for a threshold number of customers (i.e. that the first time of day is not the optimized time of day and/or that the first method of presentation is not the optimized method of presentation). In response, the AI engine may instruct the platform to delete the generic notification for transmission to all of the plurality of customers. In some embodiments, the AI engine may instruct the platform to re-write the generic notification such that the first time of day and the first method of presentation conforms to an optimized time of day and an optimized method of presentation that was identified by the AI engine while monitoring the threshold number of customers.

The apparatus and methods may include a system. The system may use light-weight computing to generate and refine notifications using artificial intelligence ("AI"). The system may include the platform and the AI engine. The platform and the AI engine may be configured to perform any of the functions described above and herein.

The platform may generate a generic notification for transmittal to the plurality of customers at the first time of day and using the first method of presentation. The generic notification may include the first information. The platform may provide an interface for interacting with the AI engine.

The system may include a database for storing historical customer data. The historical customer data may include notifications transmitted by the platform to the plurality of customers and responses of the plurality of customers to the notifications.

The system may include an application server running the AI engine. The AI engine may periodically monitor, at a given point in time, historical customer data relating to less than a predetermined number of customers. This may ensure reduced, relative to a predetermined baseline, processing usage. In some embodiments, a size of the monitored historical customer data may be less than a predetermined threshold value.

The AI engine may determine, during the monitoring, that notifications transmitted by the platform to the customer included in the plurality of customers have failed to elicit a positive response from the customer. The determination may prompt the AI engine to access and review a larger amount of customer data associated with the customer than was accessed during the monitoring.

In response to the prompting, the AI engine may instruct the platform to put the transmission of the generic notification to the customer on hold. The platform may receive the instructions from the AI engine. The platform may put the transmission of the generic notification to the customer on hold in response to the receipt of the instructions.

The application server running the AI engine may be configured to perform machine-learning analysis on data stored in the database. The analysis may generate a targeted customer notification. The machine-learning analysis may include tagging notifications stored in the database that elicited a positive customer response from the customer; filtering the tagged notifications by a time of day, a method of presentation, and a topic; and generating a predictive recommendation for a targeted customer notification based on the tagging and filtering.

The targeted customer notification may include an optimized time of day, an optimized method of presentation, and the first information. In some embodiments, the machine-learning analysis may be used to generate a tickler as described above.

The AI engine may determine if the first time of day is the optimized time of day and if the first method of presentation is the optimized method of presentation. When the first time of day is the optimized time of day and the first method of presentation is the optimized method of presentation, the AI engine may instruct the platform to remove the hold on the generic notification and to schedule the generic notification for deployment to the customer.

When either the first time of day is different from the optimized time of day or the first method of presentation is different from the optimized method of presentation, the AI engine may instruct the platform to overwrite the generic notification with the targeted customer notification for the customer. The overwriting of the generic notification may not be performed for the remaining customers included in the plurality of customers.

In some embodiments, the AI engine may schedule for deployment to the customer the targeted customer notification at the optimized time of day in the optimized method of presentation. The targeted customer notification may include the first information. In some embodiments, the AI engine may instruct the platform to schedule for deployment to the customer the targeted customer notification at the optimized time of day in the optimized method of presentation.

The first information may include data relating to a savings opportunity. The first information may include a functionality linked to an account of the recipient of the notification to pay off outstanding debt.

The platform may select the plurality of customers from a greater group of customers by identifying those customers that satisfy the one or more predetermined conditions. The one or more predetermined conditions may relate to a customer's account balance, financial history, credit card activity, or any other suitable customer information.

In some embodiments, the generic notification may be generated by the platform for the plurality of customers when the platform determines that an account associated with each of the plurality of customers satisfies one or more predetermined conditions. The platform may determine that an account satisfies the one or more predetermined conditions by accessing a customer's stored financial history and determining that the customer owns a credit card with a credit card debt amount above a threshold value and, in some embodiments, a time frame remaining for the customer to pay off the credit card debt amount is greater than a predetermined time frame.

The apparatus and the system may include the platform and the AI engine. The platform and the AI engine may each be a computer server. Computer servers, as disclosed herein, may include a processor circuit. The processor circuit may control overall operation of the server and its associated components. The server may be a network connected system. The processor circuit may include hardware, such as one or more integrated circuits that form a chipset. The hardware may include digital or analog logic circuitry configured to perform any suitable (e.g., logical) operation.

For example, a server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. Apparatus components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the server may be embodied in hardware or firmware components of the server.

The server may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), and voice input and speech recognition applications. Software application programs may utilize one or more algorithms that formulate graphical data structures, search the graphical data structures, process received executable instructions, detect activity indicators, or any other suitable tasks.

A server may include a communication circuit. The communication circuit may include a network interface card or adapter. When used in a WAN networking environment, apparatus may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

A server may utilize computer-executable instructions, such as program modules, executed by a processor. Generally, program modules include routines, programs, objects, components, data structures, etc. that perform particular tasks or implement particular abstract data types. A server may be operational with distributed computing environments where tasks are performed by remote processing devices that are linked through a communications network. In a distributed computing environment, program modules may be located in both local and remote computer storage media including memory storage devices. A server may rely on a network of remote servers hosted on the Internet to store, manage, and process data (e.g., "cloud computing" and/or "fog computing").

Servers disclosed herein may be produced by different manufacturers. For example, the platform may be run on a first server, and the AI engine may be run on a second server. A human agent may utilize a third server. Servers may capture data in different formats. Servers may use different data structures to store captured data. Servers may utilize different communication protocols to transmit captured data or communicate with other systems. Despite such operational differences, servers may be configured to operate substantially seamlessly to interact across different operating systems, hardware or networks.

The application server may run the AI engine. The application server may run the monitoring, the analysis of generic notifications, the generation of targeted notifications, etc. described above as being performed by the AI engine. The application server may provide computer resources (hardware and software) for the implementing the AI engine. The application server may provide access to network connections for the AI engine to interact with the platform, the internet, databases storing historical customer data, etc., as described herein.

The platform may include an application server. The application server may be different from the application server running the AI engine. The application server may include the AI engine. The application server, in operation, may identify the plurality of customers and generate one or more generic notifications scheduled for transmission to the plurality of customers.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system architecture 100 in accordance with principles of the disclosure. Architecture 100 may include AI Engine 101. AI Engine 101 may be in electronic communication with a plurality of databases, each database storing different data. Exemplary databases include Prior Customer Interactions 105, which may include Notifications Sent to customers 107 and Customer Response to Notifications 109. Additional exemplary databases may include Machine Learning ("ML") Algorithms 111, Transaction History 113 of the customer and the plurality of customers, Account Balances 115 of the customer and the plurality of customers, Credit Card Debt/Payment History 117 of the customer and the plurality of customers.

AI Engine 101 may also be in electronic communication with the World Wide Web ("WWW") 103. Using WWW 103, AI Engine 101 may retrieve publicly available Customer Data 121 and Social Media Profiles 119. Data retrieved from WWW 103 may be used by AI Engine 101 to refine and modify a targeted customer notification to enhance a probability of receiving a positive customer response.

Figure 2:
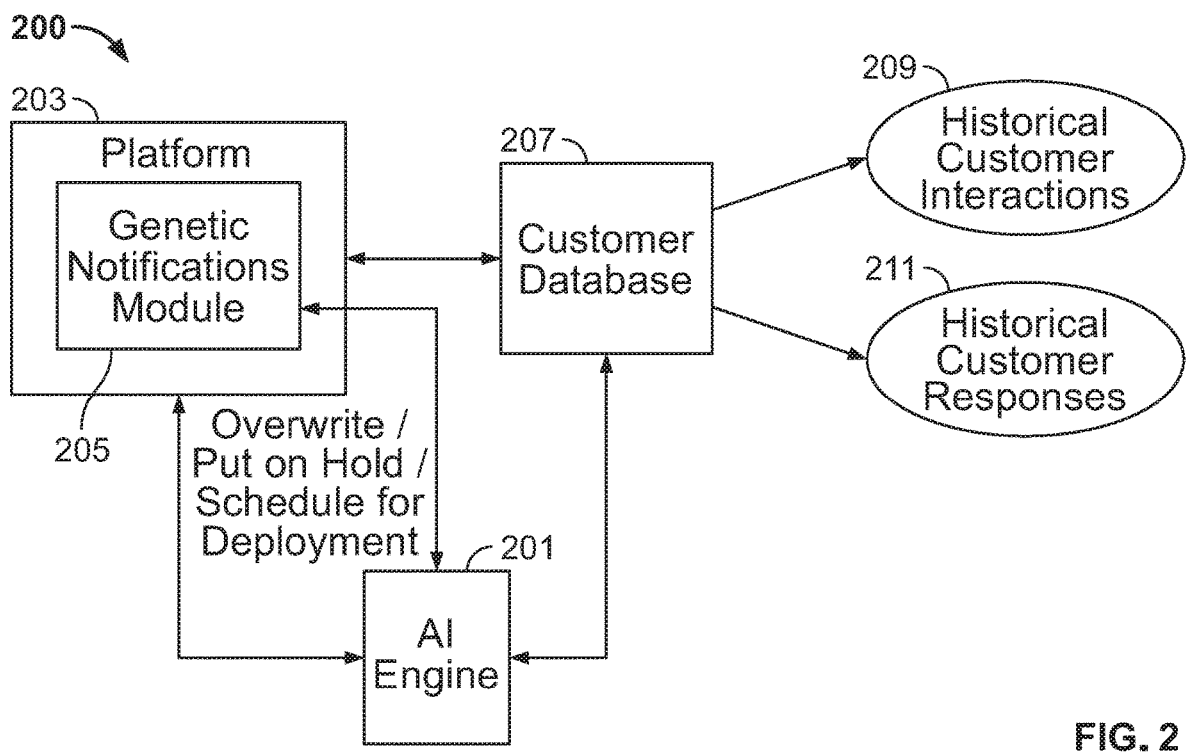
FIG. 2 shows illustrative system architecture in accordance with principles of the disclosure.

FIG. 2 shows illustrative system architecture 200 in accordance with principles of the disclosure. Architecture 200 may include AI Engine 201. AI Engine 201 may have one or more characteristics in common with AI Engine 101.

AI Engine 201 may be in electronic communication with Platform 203 and Customer Database 207. In some embodiments, Customer Database 207 may be part of Platform 203. Platform 203 may include Generic Notifications Module 205. Generic Notifications Module 205 may be used by Platform 205 to generate one or more generic notifications. Each generic notification may be scheduled for transmission/deployment to a plurality of customers. Each generic notification may be generated without reviewing and processing data associated with a single customer included in the plurality of customers.

AI Engine 201 may be in electronic communication with Generic Notifications Module 205. In some embodiments, AI Engine 201 may instruct Platform 203 to put the transmission of a generic notification to one or more customers included in the plurality of customers after monitoring customer data relating to each of the one or more customers as detailed herein. In some embodiments, AI Engine 201 may have permissions to put scheduled generic notifications on hold by accessing Platform 203.

Customer Database 207 may store data relating to Historical Customer Interactions 209 and Historical Customer Responses 211 to the stored historical customer interactions.

Figure 3A:
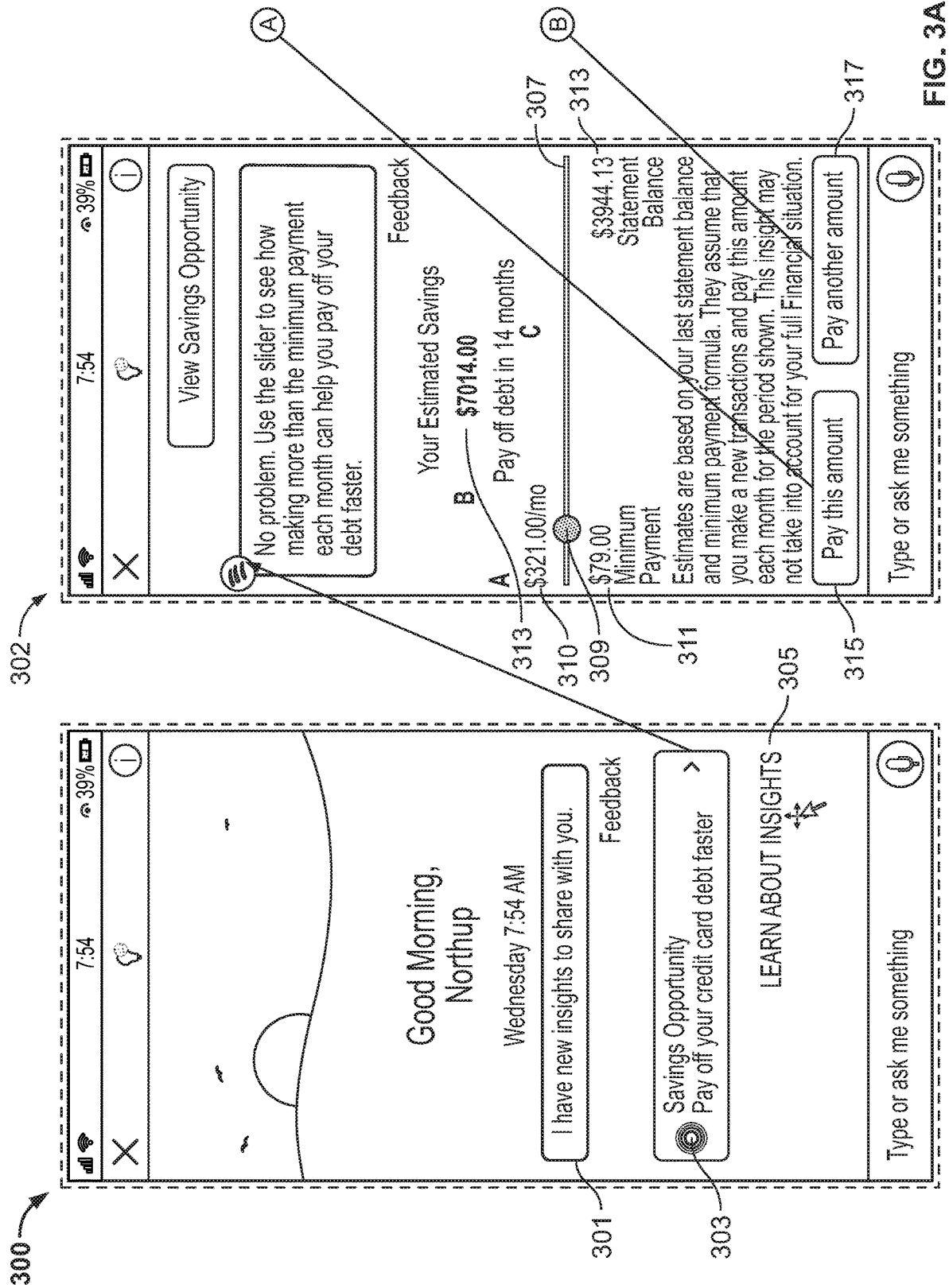
FIG. 3A shows an illustrative scenario and graphical user interfaces in accordance with principles of the disclosure.
Figure 3B:
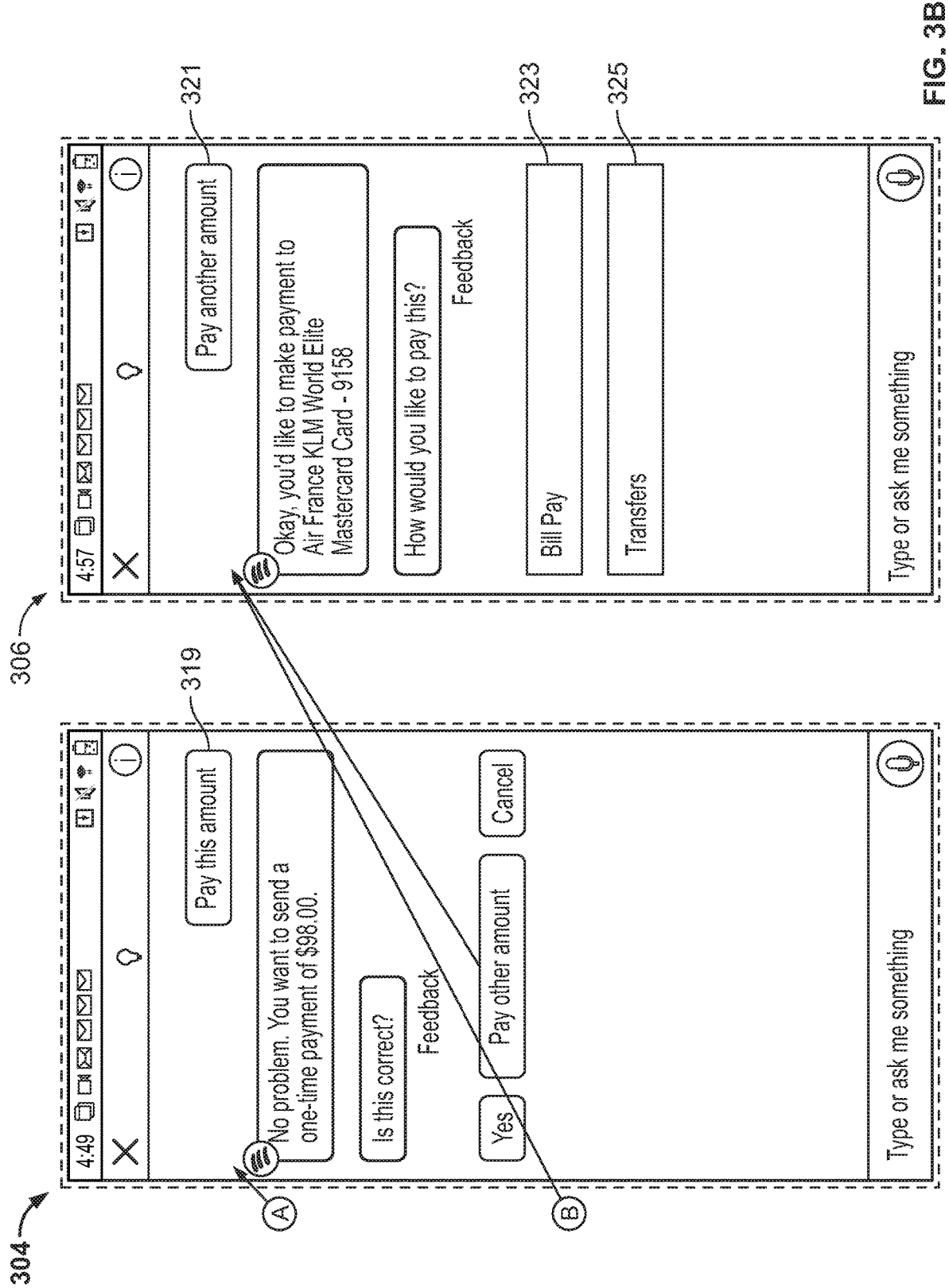
FIG. 3B shows an illustrative scenario and graphical user interfaces in accordance with principles of the disclosure.

FIG. 3A shows illustrative graphical user interface ("GUI") 300 and GUI 302. FIG. 3B shows illustrative GUI 304 and GUI 306. GUIs 300-306 may together form a 'notification' as described herein. The notification may be a generic notification generated by the platform and scheduled for deployment to a plurality of customers. The notification may be a targeted customer notification that has been modified by the AI engine as disclosed herein.

GUI 300 includes Message 301 displayed on a homepage of a user's electronic device. The user may be the customer. GUI 300 includes Message 303 displayed on a user's homepage. Message 303, when selected, may prompt the user's electronic device to display GUI 302.

GUI 302 may display to the user Minimum Payment 311 of $79.00 that is currently required to be paid monthly for a credit card issued to the user. GUI 302 may also display Statement Balance 313 of $3944.13 that is outstanding on the user's credit card.

GUI 302 may also display to the user Track 307 and Slidable Icon 309. In GUI 302, Slidable Icon 309 is positioned on Track 307 to represent New Monthly Payment 310 of $321/month for the credit card. GUI 302 displays to the user that, if the user will increase his monthly payments to New Monthly Payment 310, the user will save Estimated Savings 313 of $7014. Estimated Savings 313 may be an amount saved by the user if the user pays the displayed New Monthly Payment 310 instead of Minimum Payment 311.

Sliding Slidable Icon 309 along Track 307 to the left may decrease New Monthly Payment 310 and, therefore, decrease Estimated Savings 313. When Slidable Icon 309 is positioned all the way to the left along Track 307, New Monthly Payment 310 may be equal to Minimum Payment 311.

Sliding Slidable Icon 309 along Track 307 to the right may increase New Monthly Payment 310 and, therefore, increase Estimated Savings 313. When Slidable Icon is positioned all the way to the right along Track 307, New Monthly Payment 310 may be equal to Statement Balance 313.

Selection of selectable icon 315 may prompt the user's electronic device to display GUI 304. Selection of selectable icon 317 may prompt the user's electronic device to display GUI 306.

GUI 304 may provide the user with a functionality to pay a one-time payment of $98 when the user selects Icon 319. Selection of selectable icon "Pay other amount" may prompt the user's electronic device to display GUI 306.

In some embodiments, selection of 'pay this amount' may prompt GUI 304 to display to the user a bill-pay flow auto populated with customer account information and a bill pay amount displayed on the slider.

GUI 306 pay provide the user with a functionality to make a payment to Air France KLM World Elite Mastercard Card—9158. GUI 306 may display to the user selectable icon 312, that, when selected, provides the user to pay another mount. GUI 306 also display to the user Bill Pay 323 and Transfers 325. Each of Bill Pay 323 and Transfers 325, when selected, may provide the user with different options of how to pay off a portion of his Statement Balance 313.

In some embodiments, selection of 'pay other amount' may prompt GUI 306 to display to the user a bill pay flow auto populated with customer account number(s) and prompts for information, such as an amount to pay, and selection of an account from which to initiate a payment.

Figure 4:
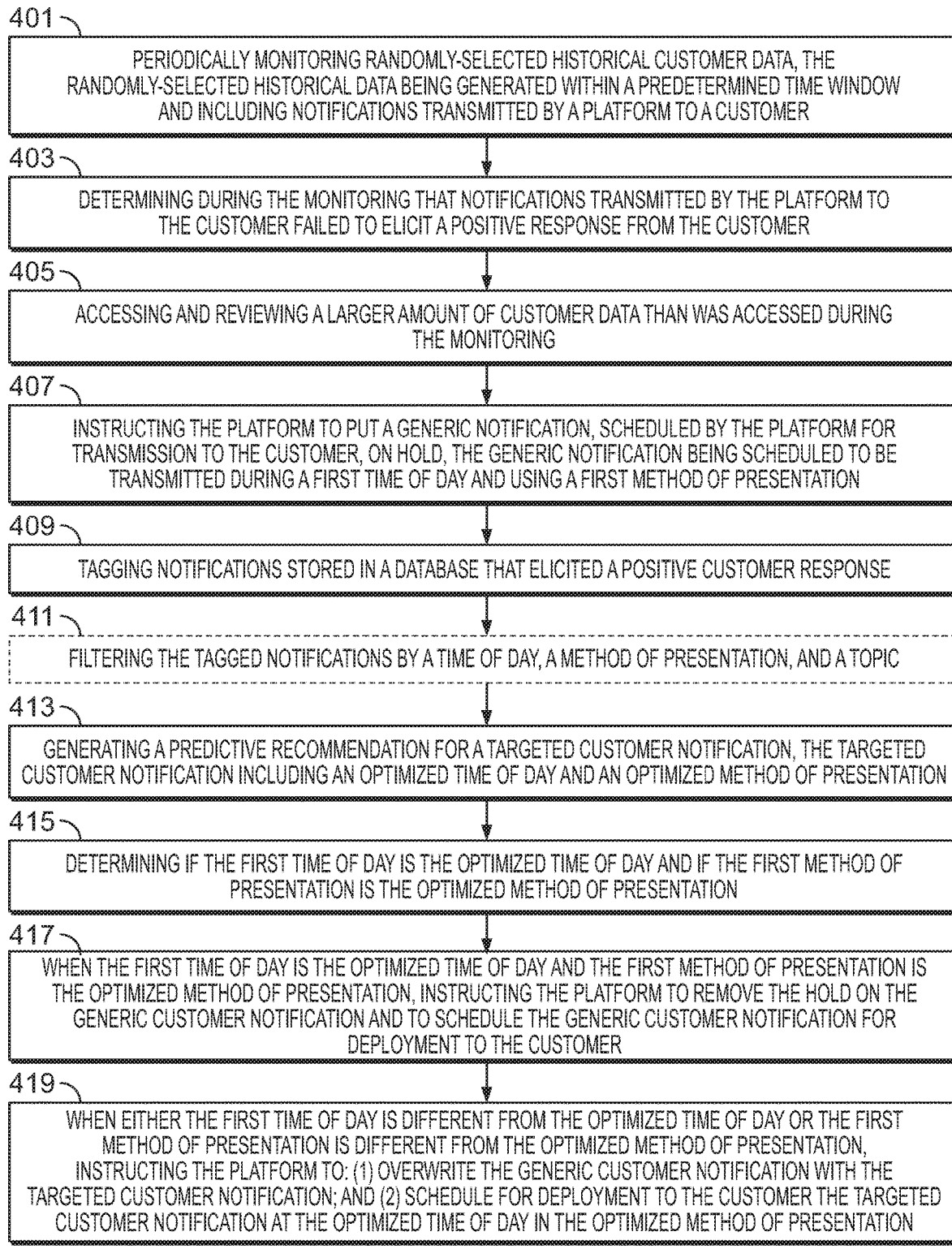
FIG. 4 shows an illustrative method in accordance with principles of the disclosure.

FIG. 4 shows an illustrative method in accordance with principles of the disclosure. The illustrative method may include some or all of steps 401-419. The illustrative method may include steps in an order different from the illustrated order. The illustrative method may include method steps not illustrated in FIG. 4 but described herein.

The method may be performed by the AI Engine. The method may be performed by the platform. A first subset of the method steps may be performed by the AI Engine and a second subset of the method steps may be performed by the platform.

At step 401, the method may include periodically monitoring randomly-selected historical customer data. The randomly-selected historical data may be generated within a predetermined time window and including notifications transmitted by a platform to a customer. At step 403, the method may include determining during the monitoring that notifications transmitted by the platform to the customer failed to elicit a positive response from the customer. At step 405, the method may include accessing and reviewing a larger amount of customer data than was accessed during the monitoring.

At step 407, the method may include instructing the platform to put a generic notification, scheduled by the platform for transmission to the customer, on hold. The generic notification may be scheduled to be transmitted to the customer during a first time of day and using a first method of presentation. At step 409, the method may include tagging notifications stored in a database that elicited a positive customer response from the customer. At step 411, the method may include filtering the tagged notifications by a time of day, a method of presentation, and a topic.

At step 413, the method may include generating a predictive recommendation for a targeted customer notification. The targeted customer notification may include an optimized time of day and an optimized method of presentation. The targeted customer notification may also include an optimized topic. At step 415, the method may include determining if the first time of day is the optimized time of day and if the first method of presentation is the optimized method of presentation.

At step 417, the method may include, when the first time of day is the optimized time of day and the first method of presentation is the optimized method of presentation, instructing the platform to remove the hold on the generic customer notification and to schedule the generic customer notification for deployment to the customer.

At step 419, the method may include, when either the first time of day is different from the optimized time of day or the first method of presentation is different from the optimized method of presentation, instructing the platform to: (1) overwrite the generic customer notification with the targeted customer notification; and (2) schedule for deployment to the customer the targeted customer notification at the optimized time of day in the optimized method of presentation.

Thus, methods and apparatus for an AI SYSTEM FOR PROCESSING HISTORICAL DATA TO IDENTIFY AND RECONFIGURE PRESCHEDULED, SUBOPTIMAL EVENTS are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for leveraging an artificial intelligence ("AI") engine to intercept and refine a generic notification generated by a platform for transmission to a plurality of customers, the AI engine using machine learning and historical behavioral trends, the method comprising:
    using the platform, scheduling the generic notification for deployment to the plurality of customers at a first time of day and in a first method of presentation, the generic notification including first information, the first information including data relating to a savings opportunity and a functionality linked to an account of a recipient of the generic notification to pay off outstanding debt, wherein each of the plurality of customers are determined by the platform to have an account that satisfies one or more predetermined conditions;
    periodically monitoring, using the AI engine, historical data stored by the platform and associated with a customer included in the plurality of customers, the historical data having been generated within a predetermined time window and including notifications transmitted by the platform to the customer, wherein the notifications reviewed by the AI engine during the monitoring are a subset of notifications stored by the platform;
    determining, using the AI engine, during the monitoring and prior to the transmission of the generic notification to the customer, that the notifications monitored by the AI engine failed to elicit a positive response from the customer, the determination prompting the AI engine to access and review a larger amount of customer data than was accessed during the monitoring, the AI engine, when prompted, also being configured to:
    instruct the platform to put the scheduled deployment of the generic notification to the customer on hold;
    tag notifications stored in a database that elicited a positive customer response;
    filter the tagged notifications by a time of day, a method of presentation, and a topic;
    generate a predictive recommendation for a tickler for presenting to the customer, the predictive recommendation including an optimized time of day, an optimized method of presentation, and an optimized topic for including in the tickler; and
    instruct the platform to transmit the tickler to the customer;
    using the platform, transmitting the tickler to the customer;
    evaluating, using the AI engine, the customer's response to the tickler;
    determining, using the AI engine, that a positive customer response is received in response to the tickler;
    determining, using the AI engine, if the first time of day is the optimized time of day and if the first method of presentation is the optimized method of presentation;
    when the AI engine determines that the first time of day is the optimized time of day and the first method of presentation is the optimized method of presentation, the AI engine being configured to instruct the platform to remove the hold on the generic notification and to schedule the generic notification for deployment to the customer; and
    when the AI engine determines that either the first time of day is different from the optimized time of day or that the first method of presentation is different from the optimized method of presentation, the AI engine being configured to instruct the platform to:
    overwrite the scheduled deployment of the generic notification to the customer with a scheduled deployment of a targeted customer notification to the customer, the targeted customer notification being scheduled for deployment at the optimized time of day in the optimized method of presentation and including the first information;
    wherein:
    the periodic monitoring of the AI engine of the historical customer data enables the platform to integrate intermittent AI decisioning into customer interactions; and
    the AI engine is configured to monitor, at a given point in time, historical data associated with less than a predetermined number of customers to ensure reduced, relative to a predetermined baseline, processing usage.

2. The method of claim 1 wherein the AI engine, during the monitoring, randomly selects the historical customer data, wherein:
    the randomly-selected historical customer data was generated within the predetermined time window; and
    a size of the randomly-selected historical customer data is less than a predetermined threshold value, to maintain the reduced processing usage.

3. The method of claim 2 wherein:
    the randomly-selected historical data includes a predetermined number of interactions between the platform and the customer; and
    if the customer's historical data does not include the predetermined number of interactions between the platform and the customer during the predetermined time window, using the AI engine to truncate the monitoring of the customer's historical data.

4. The method of claim 1 wherein the platform selects the first time of day, the first method of presentation and the first information without evaluating data specific to the customer.

5. The method of claim 1 wherein the first method of presentation is selected from a group comprising a text message, an email, a display on a homepage of a device, and a post on a social media page.

6. The method of claim 5 wherein the optimized method of presentation is selected from the group.

7. The method of claim 1 wherein:
the positive customer response includes one or more of a customer selection of a link displayed in a notification, a customer selection of a slidable icon in a notification, an input of data into a notification, and a scrolling up or down of a display included in a notification; and
the positive customer response does not include a selection, by the customer, to minimize, or close, a notification.

8. The method of claim 1, wherein the putting of the scheduled deployment of the generic notification on hold suspends the deployment of the generic notification to the customer.

9. The method of claim 1, when the AI engine determines that a positive customer response is not received in response to the tickler, the method further comprising recursively improving the decisioning of the AI engine by retrieving, by the AI engine, additional customer data, the additional customer data including publicly available customer data, historical customer transaction history, and a customer account balance;
wherein:
recursively improving the decisioning of the AI engine by accessing additional customer data increases a frequency of how often the AI engine generates a tickler that results in a positive customer response.

10. The method of claim 1 further comprising the platform, prior to scheduling the generic notification for deployment to the customer:
accessing the account of the customer;
determining if the account has sufficient funds to pay off the outstanding debt; and
scheduling the generic notification for deployment to the customer if the account has the sufficient funds.

11. The method of claim 1 wherein the platform determines that an account of the customer satisfies one or more predetermined conditions by performing the method steps of:
accessing customer stored financial history; and
determining that:
the customer owns a credit card with a credit card debt amount above a threshold value; and
a time frame remaining for the customer to pay off the credit card debt amount is greater than a predetermined time frame.

12. The method of claim 1 wherein the first information includes a display of a card debt monthly payment amount and a savings amount associated with payment of the card debt monthly payment amount, wherein the card debt monthly payment amount is greater than a minimum payment amount.

13. The method of claim 12 wherein the first information includes a slidable icon positioned on a track that, when slid by the customer along the track:
modifies the credit card debt monthly payment amount; and
modifies the savings amount.

14. The method of claim 13 wherein:
sliding the slidable icon to the right, along the track, decreases the credit card monthly payment amount and decreases the savings amount; and
sliding the slidable icon to the left, along the track, increases the credit card monthly payment amount and increases the savings amount.

15. The method of claim 13 wherein:
sliding the slidable icon to the left, along the track, decreases the credit card monthly payment amount and decreases the savings amount; and
sliding the slidable icon to the right, along the track, increases the credit card monthly payment amount and increases the savings amount.

16. A method for leveraging an artificial intelligence ("AI") engine to intercept and refine a generic notification generated by a platform for transmission to a plurality of customers, the AI engine using machine learning and historical behavioral trends, the method comprising:
using the platform, scheduling the generic notification for deployment to the plurality of customers at a first time of day and in a first method of presentation, the generic notification including first information, the first information including data relating to a savings opportunity and a functionality linked to an account of a recipient of the generic notification to pay off outstanding debt, wherein each of the plurality of customers are determined by the platform to have an account that satisfies one or more predetermined conditions;
periodically monitoring, using the AI engine, randomly-selected historical customer data stored by the platform and associated with a customer included in the plurality of customers, the randomly-selected historical customer data having been generated within a predetermined time window and including notifications transmitted by the platform to the customer, wherein a size of the randomly-selected historical customer data is less than a predetermined threshold value and the notifications reviewed by the AI engine during the monitoring are a subset of notifications stored by the platform;
determining, using the AI engine, during the monitoring and prior to the transmission of the generic notification to the customer, that the notifications monitored by the AI engine failed to elicit a positive response from the customer, the determination prompting the AI engine to access and review a larger amount of customer data than was accessed during the monitoring, the AI engine, when prompted, also being configured to:
instruct the platform to put the scheduled deployment of the generic notification to the customer on hold;
tag notifications stored in a database that elicited a positive customer response;
filter the tagged notifications by a time of day, a method of presentation, and a topic;
generate a predictive recommendation for a targeted customer notification, the targeted customer notification including an optimized time of day, an optimized method of presentation, and the first information;
determine, using the AI engine, if the first time of day is the optimized time of day and if the first method of presentation is the optimized method of presentation;
when the AI engine determines that the first time of day is the optimized time of day and the first method of presentation is the optimized method of presentation, instruct the platform to remove the hold on the generic notification and to schedule the generic notification for deployment to the customer; and when the AI engine determines that either the first time of day is different from the optimized time of day or that the first method of presentation is different from the optimized method of presentation, the AI engine being further configured to:
  overwrite for the customer, and not for the plurality of customers, the generic notification with the targeted customer notification; and
  schedule for deployment the targeted customer notification at the optimized time of day in the optimized method of presentation, the targeted customer notification including the first information;
wherein:
  the periodic monitoring of the AI engine of the historical customer data enables the platform to integrate intermittent AI decisioning into customer interactions; and
  the AI engine is configured to monitor, at a given point in time, historical data associated with less than a predetermined number of customers to ensure reduced, relative to a predetermined baseline, processing usage.

17. The method of claim 16 wherein, if the randomly-selected historical customer data does not include a predetermined number of interactions between the platform and the customer during the predetermined time window, using the AI engine to truncate the monitoring of the customer's historical data.

18. A system using light-weight computing to generate and refine generic notifications using artificial intelligence ("AI"), the system comprising:
  a platform that, in operation:
    generates a generic notification for transmittal to a plurality of customers at a first time of day and using a first method of presentation, the generic notification including first information; and
    provides an interface for interacting with an AI engine;
  a database for storing historical customer data, the historical customer data including notifications transmitted by the platform to the plurality of customers and responses of the plurality of customers to the notifications;
  an application server running the AI engine for:
    periodically monitoring, at a given point in time, historical customer data relating to less than a predetermined number of customers included in the plurality of customers to ensure reduced, relative to a predetermined baseline, processing usage;
    determining, during the monitoring, that notifications transmitted by the platform to a customer included in the plurality of customers have failed to elicit a positive response from the customer, the determination prompting the AI engine to access and review a larger amount of customer data associated with the customer than was accessed during the monitoring; and
    in response to the determining, instructing the platform to put a transmission of the generic notification to the customer on hold;
  the platform for receiving the instructions from the AI engine and putting the transmission of the generic notification to the customer on hold;
  the application server running the AI engine for performing machine-learning analysis on data stored in the database and associated with the customer to generate a targeted customer notification, the machine-learning analysis including:
    tagging notifications stored in the database that elicited a positive customer response from the customer;
    filtering the tagged notifications by a time of day, a method of presentation, and a topic;
    generating a predictive recommendation for the targeted customer notification, the targeted customer notification including an optimized time of day, an optimized method of presentation, and the first information;
    determining if the first time of day is the optimized time of day and if the first method of presentation is the optimized method of presentation;
    when the first time of day is the optimized time of day and the first method of presentation is the optimized method of presentation, instructing the platform to remove the hold on the generic notification and to schedule the generic notification for deployment to the customer; and
    when either the first time of day is different from the optimized time of day or the first method of presentation is different from the optimized method of presentation, instructing the platform to:
      overwrite the generic notification with the targeted customer notification for the customer, and not for the plurality of customers; and
      schedule for deployment to the customer the targeted customer notification at the optimized time of day in the optimized method of presentation, the targeted customer notification including the first information;
wherein:
  the first information includes data relating to a savings opportunity for presenting to the customer and a functionality linked to an account of the customer to pay off outstanding debt, the generic notification being generated by the platform for the customer when the platform determines that an account of the customer satisfies one or more predetermined conditions.

19. The system of claim 18 wherein a size of the monitored historical customer data is less than a predetermined threshold value.

20. The system of claim 18 further comprising the platform determining that an account associated with each of the plurality of customers satisfies the one or more predetermined conditions, the determination including:
  accessing, for each of the plurality of customers, stored financial history; and
  determining that, for each of the plurality of customers:
    the stored financial history includes a credit card with a credit card debt amount above a threshold value; and
    a time frame remaining to pay off the credit card debt amount is greater than a predetermined time frame.

* * * * *